Oct. 4, 1927
Re. 16,755
L. SHOWERS
PROCESS OF MAKING SHEET GLASS
Original Filed Jan. 18, 1926
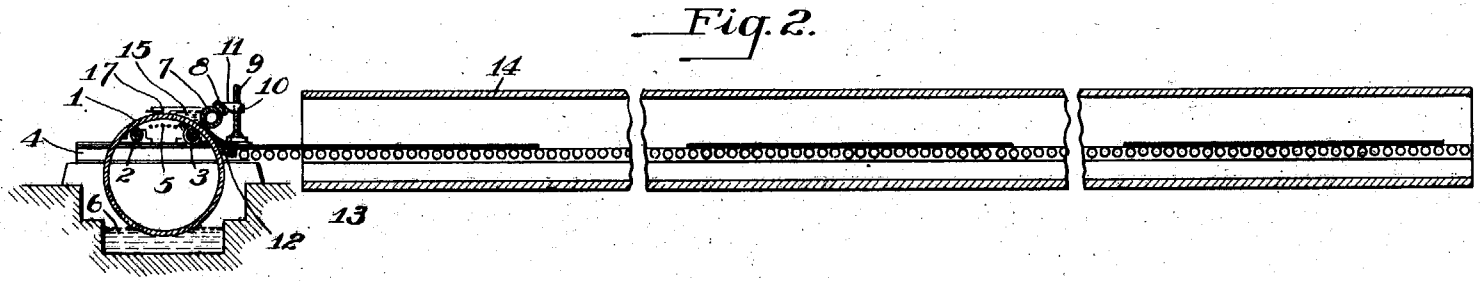
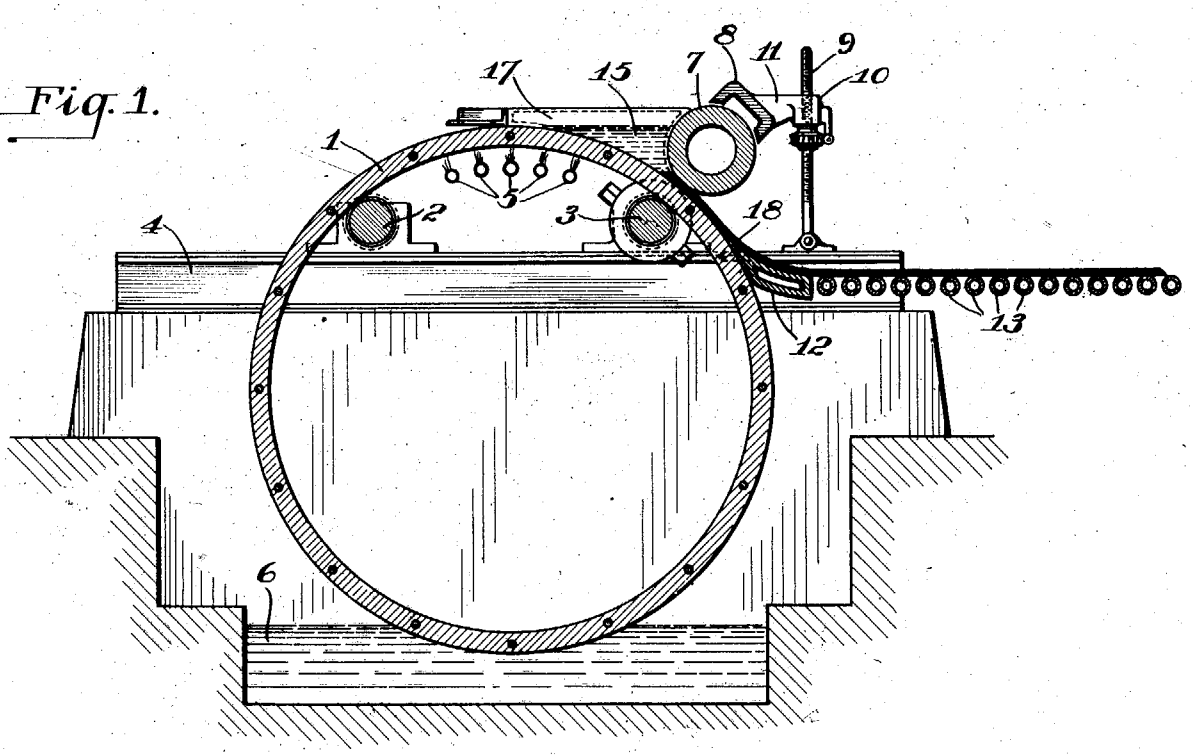
INVENTOR
Lee Showers
by
James C. Brosley
Atty.

Reissued Oct. 4, 1927. Re. 16,755

UNITED STATES PATENT OFFICE.

LEE SHOWERS, OF CHARLEROI, PENNSYLVANIA, ASSIGNOR TO PITTSBURGH PLATE GLASS COMPANY, A CORPORATION OF PENNSYLVANIA.

PROCESS OF MAKING SHEET GLASS.

Original No. 1,603,989, dated October 19, 1926, Serial No. 81,949, filed January 18, 1926. Application for reissue filed August 16, 1927. Serial No. 213,423.

The invention relates to an intermittent method of making glass sheets. It has one of its largest fields of use in the making of relatively thick colored glass, such as that known as "carrara" and used for architectural purposes in place of marble, but is not limitted to such field, and may be employed to advantage in the manufacture of transparent thick glass, or of ordinary plate glass which is ground and polished in the usual way. Carrara glass, either black or white, is now made by casting in thick slabs from pots, and then grinding and polishing the side which is to be exposed to view, and grinding (without polishing) the other side which is not exposed to view. The present process is designed to produce glass having a fire polished upper surface requiring no grinding and polishing and a lower surface which is substantially true and flat so that no grinding is required. In those cases in which a mechanically polished optically true upper surface is desired, the amount of grinding necessary is reduced to a minimum, so that the cost is materially lessened as compared with glass produced by the usual method. The form of apparatus preferably employed for producing the rolled sheet is that shown and described in my copending application, Serial Number 42,467, filed July 9, 1925, but the method is not limited to the use of that particular apparatus. Referring to the drawings:

Figure 1 is a vertical section through the rolling apparatus. And Fig. 2 is a vertical section through the complete apparatus in a very simple diagrammatic form.

Referring to the drawings, 1 is a cast metal shell of large diameter which is in effect an annular casting table and is supported upon a pair of rolls 2 and 3 which extend through the roll and are mounted in suitable bearings supported upon a framework 4 at each side of the shell. The shell is heated before the first casting operation by means of the burners 5. The shell may be mounted so that its lower portion passes through the body of liquid 6, which serves to cool the shell and keep it from becoming overheated. This cooling bath may or may not be necessary, depending upon the speed of rotation of the shell and the frequency of the casting operations, the cooling effect of the atmosphere being relatively great upon a shell of large diameter. Any other form of cooling means may, of course, be employed. Mounted in opposition to the periphery of the annular shell 1 is a water cooled sizing roll 7, such roll being journaled in a tilting framework 8 pivoted to swing around the axis of the roll 3, so that the thickness of the sheet formed may be varied by swinging the roll up or down. This adjustment may be accomplished by means of threaded arms 9 pivotally connected at their lower ends to the framework 4 and having their upper ends extended through nuts 10 swiveled in an extension 11 secured to the tilting framework 8.

In advance of the shell 1 is a water cooled table 12 for supporting and chilling the lower surface of the glass sheet preliminary to its delivery upon the rolls 13, which rolls are artificially cooled either by the circulation of air or water therethrough. These rolls extend in a continuous series through a long roller leer 14 which is several hundred feet in length and is provided with suitable temperature controlling means, so arranged that the temperature of the leer decreases progressively from its inlet to its outlet end. It is necessary to cool only the rolls in the first part of the leer, the rest of the rolls not requiring cooling and may be spaced at distances apart greater than that between the rolls at the entrance end of the leer and immediately following the table 12 where the glass is liable to sag due to its plastic condition.

A pocket 15 is provided between the shell 1 and the roll 7, the sides of this pocket being closed by means of end plates 17 which fit down between the rolls and prevent the body of glass from escaping laterally. The pocket 15 is of relatively large capacity so that it may receive an entire pot of glass weighing a ton or more and capable of forming a sheet of glass anywhere from 40 to 100 feet in length depending upon the thickness of the sheet. The sizing roll 7 and the supporting rolls 2 and 3 are driven by suitable power means, not shown, preferably of the character illustrated and described in my pending application heretofore referred to. The rolls 13 which receive the glass after it passes the table 12 are also driven at a rate of peripheral speed corresponding to that of the sizing roll 7 and the shell 1.

In carrying out the operation, a pot of glass which has been melted and fined in a pot furnace is carried to a position over the pocket 15 by means of a crane and the contents emptied into the pocket. This is preferably done quickly, the capacity of the pocket 15 being such as to receive the entire pot of glass before any substantial quantity is discharged between the shell and the sizing roll, although the rolling out of the sheet may be started, if desired, as soon as the lower portion of the pocket is filled with glass. Better results are secured when the entire pot of glass is emptied into the pocket quickly, than if a continued flow occurs from the pot as the rolling progresses.

The rolling of the sheet 18 is preferably done at a relatively high rate of speed, ranging upward from 40 feet per minute, as compared with a speed of rolling of 4 to 6 feet, such as is ordinarily employed in rolling glass continuously from a tank. The high rate of rolling has been found to give glass with less mechanical ream, with less elongation of any bubbles in the glass, and with a better surface than where such rolling is done more slowly.

With such high rolling speed, the chilling effect of the sizing roll 7 upon the surface of the glass is much reduced and only a very thin chilled skin is formed. The marring effect of this roll upon the supper surface of the glass is, therefore, much reduced and in some cases entirely eliminated, particularly in the making of thick sheets of glass. Such sheets contain a large amount of residual heat, and after the sheet passes the sizing roll, and as it is carried along over the table 12 and the rolls 13, the top skin is softened up by the volume of heat in the glass and flows somewhat, thus eliminating the marks of the roll and leaving the glass with a fire polish. This fire polish is comparable in degree with that secured in the ordinary plate glass polishing operation, but it is not optically plane and true due to the minute irregularities or waves which are always formed when the surface of molten glass solidifies. If an optically true surface is desired, it is, therefore, necessary to grind and polish the upper surface of the glass, but this grinding and polishing is reduced to a minimum by the practice of the present process, and there is a wide field for the use of white and black glass in which an optically true surface is not required, the fire finish as secured by the present process being sufficient for the purpose. In such cases, the glass produced by the present process requires no grinding or polishing either upon its upper or its lower surface. With colored glass for architectural work or for table tops, a lower polished surface is not necessary and the lower surface as produced by the present process is perfectly flat and true and relatively smooth. The present process, therefore, produces a type of glass which is much superior to the colored architectural glass heretofore produced which always required grinding on both sides and in addition required polishing upon its upper side.

The high rate of movement of the glass sheet 18 over the rolls 13 prevents the glass from sagging to any substantial degree between the rollers, even though the chilled skin on the lower side of the sheet is relatively thin. However, this speed of movement must be continued for some time after the sheet enters the leer, otherwise, it will sag. If this rate of speed were continued throughout the entire annealing operation, a leer of enormous length would be required and the present procedure is designed to avoid this necessity in so far as is possible, an unusually long leer being required in any case where sheets of unusual thickness are to be produced. It will be understood in this connection that the present process is designed to handle sheets both of unusual thickness, such as those required for colored architectural glass and also for the production of plate glass of ordinary thickness. In either case, the sheet is carried ahead at a high rate of speed until the glass has set sufficiently, or the lower surface has set sufficiently to prevent sagging. After the glass has so hardened and set, the speed of rotation of the rolls in the leer in the section occupied by the glass at that time is reduced, and from such point on the sheet is given a speed of movement which is progressively less and less. Means are, therefore, provided for driving the sets of rolls 13 in different sections of the leer at different rates of speed, so that the rate of movement of the sheet when it emerges from the leer is only a fraction of that at the entrance end of the leer. By this procedure, it is thus possible to roll the glass at a high rate of speed and still anneal it by a continuous process without making the leer of too great length. Since the operation is an intermittent one, it is possible to run the different sections of the leer at different speeds, such as would not be possible if a continuous sheet were being formed.

What I claim is:

1. A process of making glass sheet, which consists in rolling a body of molten glass laterally into a sheet at a relatively high rate of speed, carrying the sheet thus formed ahead on constantly shifting separated lines of transverse support, and then decreasing the speed of forward movement of the sheet and exposing it to a progressively decreasing temperature to anneal it.

2. A process of making a glass sheet, which consists in rolling a body of molten glass laterally into a sheet at a relatively high rate of speed, carrying the sheet thus formed ahead on constantly shifting separated lines of transverse support, and then decreasing the speed of forward movement of the sheet and exposing it to a progressively decreasing temperature to anneal it, the speed of rolling being such, and the chilling effect of the upper rolling means upon the sheet being reduced to a point such, that the residual heat of the glass after passing the rolling means, substantially removes the marring effect of the rolling means upon the upper surface of the sheet and gives a fire polish or finish to such surface.

3. A process of making a glass sheet, which consists in rolling the sheet at a relatively high rate of speed from a body of molten glass, feeding the sheet into and partially through a leer at the speed of its formation, and then feeding it onward through the leer at a lower rate of speed.

4. A process of making a glass sheet, which consists in forming the sheet at a relatively high rate of speed from a body of molten glass, feeding the sheet into and partially through a leer at the speed of its formation, and then feeding it onward through the leer at a lower rate of speed.

In testimony whereof, I have hereunto subscribed my name this 15th day of August, 1927.

LEE SHOWERS.